UNITED STATES PATENT OFFICE.

CHARLES CATLETT, OF STAUNTON, VIRGINIA.

PROCESS OF TREATING LIME.

1,308,931.        Specification of Letters Patent.        Patented July 8, 1919.

No Drawing. Original application filed May 9, 1918, Serial No. 233,564. Divided and this application filed September 23, 1918. Serial No. 255,389.

*To all whom it may concern:*

Be it known that I, CHARLES CATLETT, a citizen of the United States, residing at Staunton, in the county of Augusta and State of Virginia, have invented certain new and useful Improvements in Processes of Treating Lime; and I do hereby declare the following to be a full, clear, and exact description of the invention, such as will enable others skilled in the art to which it appertains to make and use the same.

This invention relates to processes of treating lime, and more particularly to processes of slaking lime for the production of mortar or plaster of particularly desirable characteristics and quality.

In preparing lime plaster and similar mixtures, and particularly in the case of mixtures to be used as wall finishes and the like, it is essential that the plaster or mortar have a high degree of hardness and toughness, and that it be as free as possible from tendency to blister or check after application. The treatment of lime to render it especially adapted for this purpose, and the production of such plasters or mortars, are principal objects attained according to the process of the present invention.

I have found that by slaking lime in the presence of an added oxysalt or oxysalt composition, and particularly in the presence of a calcium oxychlorid composition, the hydration proceeds more smoothly, efficiently and completely, and that plasters or mortars made with it show pronounced superiority over ordinary plaster or mortar in important respects. The oxysalt composition need be employed in only comparatively small percentages in order to effect a marked improvement in the plaster or mortar. The oxysalt compounds suitable for use in this connection are various; but those which can be prepared and kept in finely divided or pulverized form, and which upon treatment with excess of water will break down rather readily, yielding a metallic salt such as a chlorid, and also a hydrate or a hydroxid, or at any rate conducting themselves in a manner indicating such action, are especially suitable. Compounds or compositions of this general description, and in particular, an especially suitable composition comprising hydrated oxychlorids of calcium and magnesium as characteristic ingredients, are disclosed in my copending application Serial No. 233,564, filed May 9, 1918, of which the present application is a division. For the sake of illustration, a particularly desirable embodiment of the present invention involving the use of the aforesaid oxychlorid composition will be more particularly described; but it is to be understood that the invention is not limited to the employment of such oxysalt compound or composition. In a typical instance, an oxychlorid composition of the character in question analyzes approximately as follows:

| | |
|---|---|
| Lime (CaO) | 53.00% |
| Calcium chlorid | 31.90% |
| Magnesia (MgO), etc. | 1.10% |
| Water | 14.00% |
| | 100.00% |

It is to be understood that in the foregoing analysis no attempt has been made to indicate the exact form in which the various constituents named may be present, and that the chlorin content has been expressed in terms of calcium chlorid simply for purposes of convenience; the probability being that practically no calcium chlorid normally exists as such in the composition. Apparently the composition comprises mainly a hydrated oxychlorid of calcium, or a mixture of several hydrated oxychlorids of calcium and magnesium, accompanied by more or less hydrated lime and magnesia. In referring herein to calcium oxychlorid, or to oxychlorids and oxysalts generally, it is not to be understood that a compound of fixed or invariable formula is meant. Oxychlorid of calcium, for example, may vary considerably in constitution, more especially as regards its water of combination or crystallization, depending upon the conditions under which it is formed, the character and proportions of the reacting materials from which it is derived, and other factors. The term calcium oxychlorid is here used broadly to designate any of the products commonly resulting from the reaction between lime and calcium chlorid in the presence of water, and particularly such products as partake of the nature of set oxychlorid cement products. A similar meaning is to be understood as intended by reference herein to oxychlorids or oxysalts generally of other alkaline or earth metals, such as magnesium, zinc, etc. Compositions of this general character may be prepared in various ways. For example, in preparing a calcium oxychlorid composition having substantially the above analysis, 100 parts of a high calcium commercial ground quick-lime may be mixed with 60 parts of commercial calcium chlorid (75% $CaCl_2$) and 50 parts of water, all parts by weight. The ensuing reaction develops considerable heat and the mixture finally sets into a hard but porous and more or less friable mass, which, after standing a day or two, is in such condition that it may be easily ground or otherwise reduced to a powder, most desirably fine enough to pass 100 mesh. This pulverulent oxychlorid composition, though containing water of hydration, is substantially dry to the touch, and keeps for a long time without substantial alteration in ordinary closed containers such as barrels and the like. When mixed with water, rapid decomposition of the oxychlorid composition takes place, the character of the reaction indicating the simultaneous production of calcium chlorid and calcium hydrate or hydroxid in immediately available form and highly reactive condition. This ready decomposability with excess of water is an especially desirable characteristic of oxysalt compositions adapted for use in practising the present invention. Furthermore, compositions comprising several oxysalts, such as a mixture or chemical association of oxychlorids of calcium and magnesium in the particular composition above described, are found to act efficiently in this connection and to offer some advantages in practice.

Where lime mortar or plaster is to be prepared in accordance with the invention, the lime may be slaked, with sufficient water to form a plaster, in the presence of a small percentage of the oxychlorid or other added oxysalt composition, which may be mixed with the lime in any convenient manner, the percentage employed ordinarily and most desirably ranging in practice from 1½% to 5% by weight of the lime. Under these conditions, the lime is found to slake much more thoroughly and completely. The oxysalt composition may also be added to a lime mortar or plaster, whether made with hydrated lime or lime paste. In preparing plaster or mortar in the manner described, the lime is found to slake much more thoroughly and completely, with the result that the plaster obtained has its lime content more perfectly hydrated, possesses greater plasticity, hardens more rapidly, ultimately becomes harder or tougher, and is more resistant to water, than ordinary lime plaster. In fact, plaster prepared in this way is an excellent substitute for the well known Keene cement and can replace the latter in most classes of work.

What I claim is:

1. The process of producing lime compositions which comprises mixing lime and a pulverulent oxysalt with water.

2. The process of producing lime compositions which comprises mixing lime and a pulverulent oxysalt of an earth metal with water.

3. The process of producing lime compositions which comprises mixing lime and a pulverulent oxychlorid of calcium with water.

4. The process of slaking burned lime which comprises mixing said lime with water and a pulverulent oxysalt.

5. The process of slaking burned lime which comprises mixing said lime with water and a pulverulent oxysalt of an earth metal.

6. The process of slaking burned lime which comprises mixing said lime with water and a pulverulent oxychlorid of calcium.

7. The process of slaking burned lime which comprises mixing said lime with water and oxychlorids of calcium and magnesium.

8. The process of slaking lime which comprises subjecting lime to the action of water in the presence of a plurality of oxysalts.

9. The process of slaking lime which comprises mixing lime with water and a calcium oxychlorid composition in proper proportions to form a plaster.

10. The process of slaking lime which comprises mixing lime with water and a calcium oxychlorid composition in proper proportions to form a plaster, said calcium oxychlorid composition being employed in amounts up to around 5 per cent. by weight of the lime.

11. The process of preparing plaster or mortar which comprises treating lime with an oxysalt composition and enough water to produce a wet plastic mixture.

12. The process of preparing plaster or mortar which comprises commingling lime and a relatively small proportion of a pulverulent oxysalt composition with enough water to produce a wet plastic mixture.

13. The process of preparing plaster or mortar which comprises commingling lime and a relatively small proportion of a pulverulent calcium oxychlorid composition with enough water to produce a wet plastic mixture.

In testimony whereof I hereunto affix my signature.

CHARLES CATLETT.